UNITED STATES PATENT OFFICE 2,407,204

TRIAZOLO (d) PYRIMIDINES AND METHODS OF PREPARING THE SAME

Jackson P. English, Stamford, James R. Vaughan, Jr., Greenwich, and Richard O. Roblin, Jr., Old Greenwich, Conn., assignors to American Cyanamid Company, New York, N. Y., a corporation of Maine No Drawing. Application July 22, 1944, Serial No. 546,206

8 Claims. (Cl. 260—251)

This invention relates to new chemical compounds, and to methods of preparing the same. More particularly, the invention relates to triazolo (d) pyrimidines and reaction products thereof.

We have found that triazolo (d) pyrimidines having, in one of their tautomeric forms, the following structural formula:

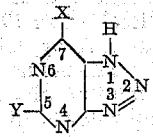

wherein X and Y represent the same or different hydrogen, alkylthio, alkoxy, alkylamino, hydroxy, amino, and thio radicals are formed when appropriate 4,5-diaminopyrimidines or their salts are mixed with nitrous acid in a suitable liquid reaction medium.

The compounds of the present invention are generally characterized as amphoteric, white-to-light yellow, crystalline solids somewhat soluble in water but soluble to a greater extent in aqueous solutions of alkalis or strong acids. In general, they are soluble in polar organic solvents such as Cellosolve, dioxane, etc. They decompose at high temperatures, usually without melting.

The compounds of the present invention inhibit the growth of microorganisms and therefore are useful as bacteriostatic agents. They are also useful as intermediates in the preparation of other organic substances.

A large number of 4,5-diaminopyrimidines can be employed in the reaction described herein. Among these may be specifically mentioned: 4,5,6-triaminopyrimidine, 4,5-diamino-6-hydroxypyrimidine, 2,4,5-triaminopyrimidine, 4,5-diamino-6-thiopyrimidine, 2-thio-4,5-diaminopyrimidine, 2,6-dithio-4,5-diaminopyrimidine, 2-6-dihydroxy-4,5-diaminopyrimidine, 2,4,5,6-tetraaminopyrimidine, 2,6-dihydroxy-4,5-diaminopyrimidine, 2,4,5-triamino-6-hydroxypyrimidine, 2,6-diethylamino-4,5-diaminopyrimidine, 2-ethyl-thio-6-hydroxy-4,5-diaminopyrimidine, 2-methoxy-4,5-6-triaminopyrimidine, etc.

In carrying out our invention nitrous acid is used to form the triazole ring with a 4,5-diaminopyrimidine. The nitrous acid may be from any source and may be added directly to the reaction mixture or, preferably, it may be formed within the reaction medium by the action of an acid such as acetic, nitric, hydrochloric, sulfuric, etc., on an alkali or alkaline earth metal nitrite such as sodium nitrite and potassium nitrite. We may also use organic nitrites such as ethyl nitrite and amyl nitrite, although they are usually less desirable.

The reaction between 4,5-diaminopyrimidines and nitrous acids takes place readily at temperatures between about 0° C. and 125° C. A convenient method of conducting the reaction is to mix the reactants in a suitable solvent or diluent at room temperature and warm gently until all the gas formed has been driven off. The reaction is then completed by a short period of heating on a steam bath.

The crude product may be isolated from the reaction mixture as an insoluble precipitate by chilling the mixture or it may be isolated as the silver salt upon the addition of an excess of silver nitrate solution to the reaction mixture. The insoluble silver salt is then separated, suspended in water, and treated with hydrogen sulfide to remove the silver as silver sulfide.

In carrying out our invention a substituted 4,5-diaminopyrimidine is dissolved in water, usually with the help of an added acid. An aqueous solution of an alkali or an alkaline earth metal nitrite is added with stirring. A white precipitate of the crude product separates almost immediately, and the reaction is completed by heating the mixture on a steam bath for a period usually less than an hour. The order of mixing the reactants is not considered critical since the compounds can also be prepared by mixing the 4,5-diaminopyrimidine and the nitrite salt in solution followed by the slow addition of a suitable acid.

The product is purified by recrystallization from aqueous solution or by dissolving in an alkaline solution, treating with activated charcoal, and precipitation with an acid or by means of silver nitrate.

Our invention will now be illustrated in greater detail by means of the following specific examples, in which representative triazolo (d) pyrimidines are prepared. The compounds prepared and claimed hereinafter are named in accordance with the ring index system as outlined by Patterson and Capell, American Chemical Society Monograph No. 84, page 114, system No. 702. The parts are by weight unless otherwise specified.

EXAMPLE 1

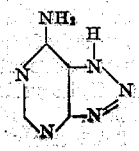

7-amino-1-u-triazolo (d) pyrimidine 0.75 part of 4,5,6-triaminopyrimidine is dissolved in 75 parts of water containing 5 parts by volume of glacial acetic acid, and the solution is well cooled. A solution of 0.42 part of sodium nitrite in 5 parts of water is then added with stirring. A white precipitate separates almost immediately. The mixture is then heated for 20 minutes on a steam bath, cooled, and the insoluble product filtered off. This is purified by dissolving it in 50 parts of water containing 0.5 part by volume of concentrated ammonium hydroxide, decolorizing the solution with charcoal, and reprecipitating the product by neutralizing the solution with acetic acid. The product is dried at 85° C. to yield 0.65 part (80% yield) of 7-amino-1-u-triazolo (d) pyrimidine which decomposes rapidly without melting at 345° C. and is unstable above 310° C.

EXAMPLE 2

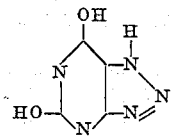

5,7-dihydroxy-1-u-triazolo (d) pyrimidine 4.0 parts of 2-thio-4,5-diamino-6-hydroxypyrimidine hydrochloride is heated on the steam bath with 100 parts of 25% nitric acid until complete solution occurs and there is no further evolution of gas. The product is then precipitated from the hot nitric acid as the colorless, crystalline silver salt by addition of an excess of silver nitrate solution. This mixture is well cooled in the dark, after which the silver salt is removed and well washed with water. The salt is then placed in 100 parts of boiling water, and hydrogen sulfide is passed through the mixture for 5 minutes to precipitate the silver as silver sulfide. This is removed, and the hot, light yellow filtrate is concentrated to half its volume and cooled to yield 0.75 part of crystalline material. Evaporation of the remaining solution to dryness yields an additional 0.10 part (3.4%) of material. These solids are combined and recrystallized from 25 parts of hot water to yield 5,7-dihydroxy-1-u-triazolo (d) pyrimidine which darkens above 260° C. and decomposes rapidly without melting at 308° C.

EXAMPLE 3

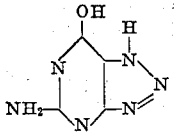

5-amino-7-hydroxy-1-u-triazolo (d) pyrimidine (A) One part of 2,4,5-triamino-6-hydroxypyrimidine is suspended in 30 parts of water containing 1.5 parts of sodium nitrite, and the mixture is well cooled. Concentrated hydrochloric acid is then added dropwise and with stirring until the solution become clear red in color and contains only a small amount of dark red precipitate. The solution is then warmed gently until the evolution of gas ceases and then heated vigorously on the steam bath for 30 minutes. The resulting light yellow solution is filtered and cooled. On standing for several hours, 0.75 part (69% yield) of crude, light yellow product crystallizes from the solution.

(B) 7.0 parts of 2,4,5-triamino-6-hydroxypyrimidine sulfate is placed in 100 parts of water and solution effected by addition of a small amount of sodium hydroxide. 5.0 parts of sodium nitrite is added to this solution and the whole neutralized, then acidified, by dropwise addition of glacial acetic acid. The product separates slowly as a reddish-yellow powder. The mixture is heated on the steam bath for 45 minutes and then cooled for 12 to 24 hours. The product which separates slowly is removed and washed with dilute acetic acid, then with water. 3.4 parts (76.5% yield) of crude material is obtained in this manner.

The crude product obtained by methods (A) and (B) is purified by dissolving 4.0 parts in 30 parts of 5% sodium hydroxide and boiling for several minutes with Darco. The solution is filtered, the product reprecipitated with acetic acid, and the complete process then repeated. The material obtained in this manner is then dried in vacuo for 24 hours. The yield is 3.45 parts of 5-amino-7-hydroxy-1-u-triazolo (d) pyrimidine which decomposes without melting at 305° C.

EXAMPLE 4

5,7-dihydroxy-1-u-triazolo (d) pyrimidine 0.55 part of 5-amino-7-hydroxyl-1-u-triazolo (d) pyrimidine is dissolved in 10 parts of boiling water containing 1.0 part by volume of concentrated sulfuric acid. The solution is then cooled to 60–70° C., and a solution of 0.5 part of sodium nitrite in 2.0 parts of water is added in small portions and with vigorous shaking. After the addition is complete and gas is no longer evolved, the reaction mixture is cooled for 2 to 3 hours to crystallize out 0.46 part of crude product. This is recrystallized from 15 parts of boiling water as very light yellow crystals of indefinite shape. After drying in vacuo for 24 hours the yield is 0.29 part of 5-7-dihydroxy-1-u-triazolo (d) pyrimidine which decomposes without melting above 290° C.

EXAMPLE 5

7-hydroxy-1-u-triazolo (d) pyrimidine

One part of 4,5-diamino-6-hydroxypyrimidine is suspended in 30 parts of water containing 1.5 parts of sodium nitrite, and the mixture is cooled. Concentrated hydrochloric acid is then added dropwise and with stirring until the solution becomes clear red in color and contains only a small amount of dark red precipitate. The solution is then warmed gently until the evolution of gas ceases and then heated vigorously on the steam bath for 30 minutes. The resulting light yellow solution is filtered and, on standing for several hours, a light yellow product crystallizes from the solution. The crude product is dissolved in 5% sodium hydroxide and boiled with Darco. The solution is filtered, the product reprecipitated with acetic acid, and the complete process then repeated. The residue is removed, washed with water and dried in vacuo for 24 hours. The product was 7-hydroxy-1-u-triazolo (d) pyrimidine.

We claim:

1. Chemical compounds corresponding to the general formula:

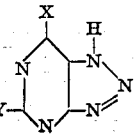

wherein X and Y are members of the group consisting of hydrogen, hydroxy, amino, thio, alkylthio, alkoxy, and alkylamino radicals.

2. 7-amino-1-u-triazolo (d) pyrimidine having the formula

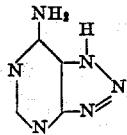

3. 7-hydroxy-1-u-triazolo (d) pyrimidine having the formula

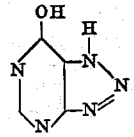

4. 5-amino-7-hydroxy-1-u-triazolo (d) pyrimidine having the formula:

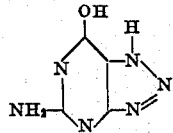

5. The method of preparing chemical compounds corresponding to the general formula:

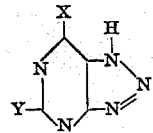

wherein X and Y are members of the class consisting of hydrogen, hydroxy, amino, thio, alkylthio, alkoxy, alkylamino radicals which comprises mixing together and heating a compound corresponding to the general formula:

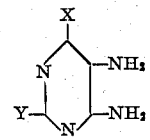

wherein X and Y are as designated above, a solvent and nitrous acid.

6. A method of preparing 7-amino-1-u-triazolo (d) pyrimidine having the formula

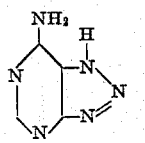

which comprises mixing together 4,5,6-triaminopyrimidine and nitrous acid.

7. A method of preparing 7-hydroxy-1-u-triazolo (d) pyrimidine having the formula

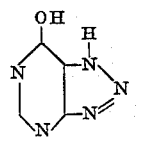

which comprises heating together 4,5-diamino-6-hydroxypyrimidine and nitrous acid.

8. A method of preparing 5-amino-7-hydroxy-1-u-triazolo (d) pyrimidine having the formula:

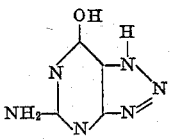

which comprises heating together 2,4,5-triamino-6-hydroxypyrimidine and nitrous acid.

JACKSON P. ENGLISH.
JAMES R. VAUGHAN, Jr.
RICHARD O. ROBLIN, Jr.